350-377 SR 30W
XR 3,594,064 T 365/122 EX

[11] 3,594,064

[72] Inventors John David Bierlein
Wilmington, Del.;
E. I. du Pont de Nemours and Company,
Wilmington, Del.

[21] Appl. No. 836,275
[22] Filed June 25, 1969
[45] Patented July 20, 1971

[54] ENHANCED MAGNETO-OPTIC MIRROR APPARATUS
4 Claims, 6 Drawing Figs.

[52] U.S. Cl. 350/151, 340/174.1 M
[51] Int. Cl. G02f 1/18
[50] Field of Search 350/149—151, 160; 340/174.1, 174.1 M

[56] References Cited
UNITED STATES PATENTS
3,427,092 2/1969 Smith 350/151
3,474,428 10/1969 Nelson et al. 350/151 UX
OTHER REFERENCES
Alstad et al. " Magneto-Optic Readout Device" IBM TECHNICAL DISCLOSURE BULLETIN, Vol. 9, No. 12 (May, 1967) pp.1763—4

*Primary Examiner*—David Schonberg
*Assistant Examiner*—Paul R. Miller
*Attorney*—D. R. J. Boyd

ABSTRACT: A transparent medium (usually a prism) having a magnetic mirror of a thin magnetic layer, a conversion matching dielectric layer, and finally a reflecting layer provides enhanced longitudinal Kerr effect conversivity with low ellipticity for reflected radiation. The magnetic mirror converts magnetic signals to signals of electromagnetic radiation and can be used for the optical readout of magnetic tapes.

INVENTOR
JOHN DAVID BIERLEIN

BY D. H. Boyd
ATTORNEY

INVENTOR
JOHN DAVID BIERLEIN

D.R. Boyd
ATTORNEY

ENHANCED MAGNETO-OPTIC MIRROR APPARATUS

FIELD OF THE INVENTION AND PRIOR ART

This invention relates to apparatus for the optical detection of magnetic signals. More particularly, this invention relates to magneto-optic devices having improved longitudinal Kerr conversivity.

Various forms of apparatus employing the Kerr magneto-optic effect, that is the rotation of the plane of polarization of radiation reflected by a magnetic surface, are known in the art. Such apparatus, employing visible light, can be used to make visible magnetic images on magnetic recording media. The known apparatus, in general, consists of a source of polarized light directed to a magnetic mirror surface on which the magnetic signals from the recording member are temporarily impressed, and an analyzer for the reflected light. The conversivity, which is a measure of the degree of rotation of the polarized light for the magnetized mirror, is very small and it has long been desired in the art to improve the conversivity of magnetic mirrors employed for longitudinal Kerr effect readout of magnetic signals.

SUMMARY OF THE INVENTION

The apparatus of the present invention is a Kerr magneto-optic device adapted to rotate the plane of polarization of electromagnetic radiation on reflection from a magnetic mirror in response to the magnetization of said mirror which is a composite of the following layers, in sequence:

i. an isotropic incident medium transparent to selected electromagnetic radiation and having a refractive index of $n$ at the boundary to (ii);

ii. an absorbing magnetic layer, the thickness of the magnetic layer being such that the product $$dk \leq 0.12\lambda$$

where $d$ is the thickness of the magnetic layer having the imaginary part of the refractive index $k$ at the wavelength of the selected radiation, $\lambda$;

iii. a dielectric layer, the refractive index of the dielectric layer being between $n$ and about $n \sin \theta$, where $\theta$ is the selected angle of incidence for the selected radiation at the boundary between the incident medium and the first magnetic layer and having a thickness selected to substantially enchance the conversivity of the device; and iv. a metallic reflecting layer.

THE DRAWINGS

This invention will be better understood by reference to the drawings which accompany this specification. In the drawings; throughout which the same numeral designates like parts:

Figure 1:
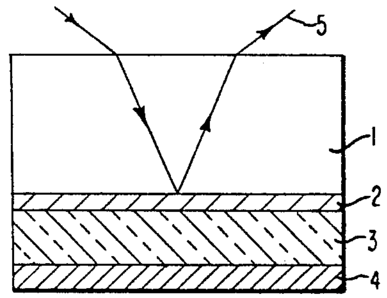
FIG. 1 is a sectional diagram of a simple structure of the present invention.

Referring to the drawings, in FIG. 1 the incident medium 1 is a solid slab, which acts as a support for a magnetic layer 2, a dielectric layer 3 and a reflecting coating 4. The selected electromagnetic radiation, having the wavelength $\lambda$, is incident at a selected angle $\theta$ on the magnetic coating 2. The path of the radiation is shown by line 5 bearing directional arrows. In the present invention, the angle of entry of the light must be selected to be close to the critical angle of reflection passing from the incident medium to the dielectric layer. With the configuration shown in FIG. 1, this is only possible if the refractive index of the medium outside the incident medium is greater than that of the dielectric layer.

The incident medium can be of any desired thickness and of any convenient configuration, provided it is transparent to the selected radiation and can provide the essential conditions of incidence at about total reflection. Preferably, the incident medium is a solid, as shown in the figures, since the thin magnetic and dielectric layers can be conveniently fabricated on the surface of such a solid incident medium as a support, while the magnetic layer 2 is accessible to magnetic fields through the layers 3 and 4. The dielectric layer 3 must be chosen so that the incident radiation is at about the critical angle for reflection between the incident medium and the dielectric layer; if the refractive index of the incident medium is $n$, the refraction index of the dielectric layer must be less than $n$ and preferably should be in the vicinity of $n \sin \theta$.

In order to obtain a high value of the conversivity for absorbing magnetic materials, the magnetic layer should be as thin as possible, compatible with the existence of ferromagnetism. In any case, the magnetic layer should have a thickness, $d$, less than about $$d=1.5\lambda/4\pi k, \text{ i.e., } dk=0.12\lambda$$

when $k$ is the imaginary part of the complex refractive index of the magnetic layer.

Any magnetic material can be used for this layer. For visible light with $\lambda$=6,000 A. and an iron film $k$=3.5, the thickness of the magnetic iron layer should be less than 200 A.

The optimum thickness of the dielectric layer is calculated by procedures which are discussed hereinafter.

The reflecting layer can be of any suitable reflecting metal having a thickness sufficient to optically isolate the system.

Other layers such as wear coating may be added to the structure as desired.

Figure 2:
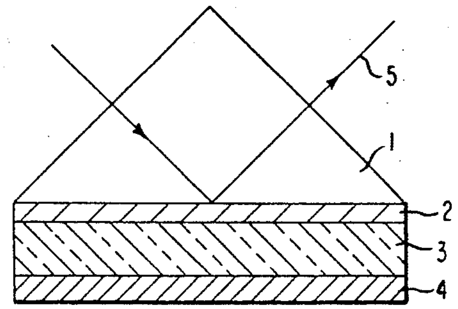
FIG. 2 is a sectional diagram of a structure of the present invention using a prism as the incident medium.

FIG. 2 shows the incident medium in the structure of FIG. 1 in the form of a prism. A prism having a base equal to the selected incident angle and with the layered magnetic structure at the face opposite the apex angle is preferred since the incident radiation then impinges on the incident medium perpendicular to the face of the prism.

Figure 3:
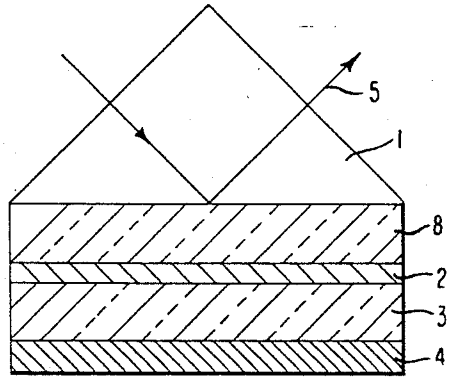
FIG. 3 is another embodiment of the present invention employing a compound incident medium.

FIG. 3 shows yet another modification of the apparatus of this invention in which a thin dielectric layer 8 is placed between the face of the prism and the first magnetic layer. The compound incident medium will in general increase the overall magneto-optic conversivity, although in general this increase is not significant. The layer 8, however, can be used to reduce undesired ellipticity of the reflected light without adversely affecting the conversivity.

Figure 4:
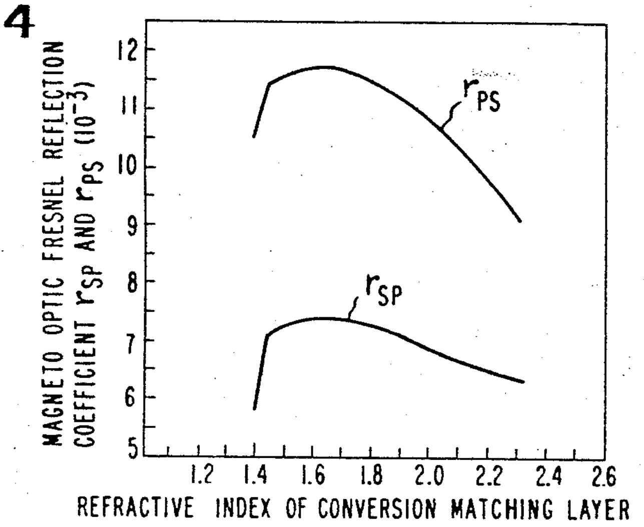
FIG. 4 shows the calculated Fresnel reflective coefficients $r_{sp}$ and $r_{pd}$ as a function of the refractive index of the conversion matching layer. For the configuration shown in FIG. 2, the angle of incidence is 50°, the magnetic layer is an iron film of 100 A. thickness, the reflecting layer is silver, and the refractive index of the incident medium is 1.88.
Figure 5:
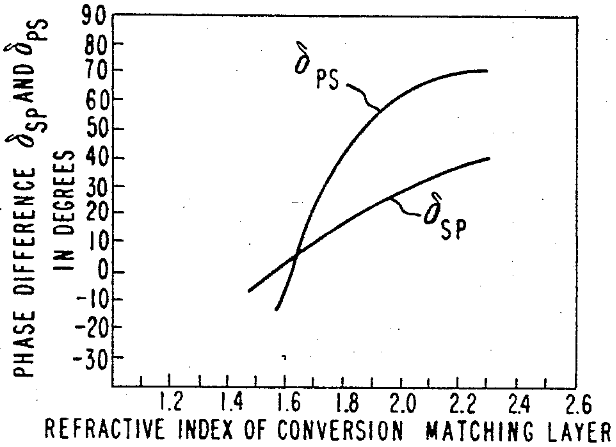
FIG. 5 shows a plot of the phase difference between magneto-optic and normal Fresnel reflection coefficients, for incident light polarized in and normal to the plane of incidence, respectively, plotted as a function of refractive index of the conversion matching layer for the same configuration as in FIG. 2.
Figure 6:
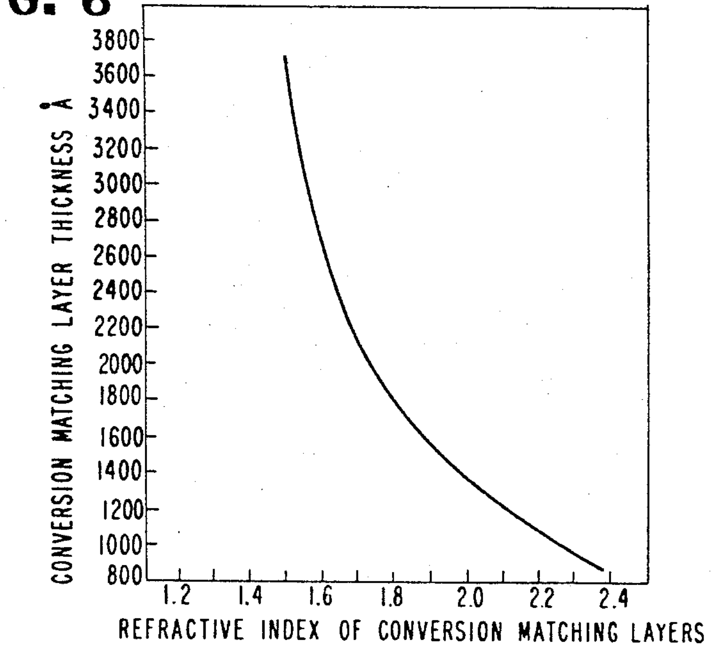
FIG. 6 shows a plot of the optimum thickness of the matching layer as a function of its refractive index for the configuration of FIG. 2.

FIGS. 4, 5 and 6 will be described hereinafter in connection with a specific embodiment of the invention.

DETAILED DESCRIPTION OF THE INVENTION

The incident medium can be any isotropic dielectric transparent to the selected electromagnetic radiation and having a sufficiently high refractive index at the wavelength of the selected radiation to permit the choice of a suitable dielectric layer with a convenient angle of incidence. Preferably, the incident medium is a solid. Further, it is preferred that the incident medium has the form of a prism so that the incident light is approximately normal to the face. As noted above, the incident medium can be compound and can comprise one or more dielectric layers at the surface thereof adjacent to the magnetic layer to reduce the ellipticity of the reflected light without adversely affecting the conversivity.

When the selected electromagnetic radiation is visible light, optical glasses are preferred as the incident medium. Transparent plastics such as poly (methyl methacrylate) can also be used as the incident medium.

The dielectric materials must be capable of being formed into thin films, and must have a suitable refractive index.

There are many dielectric materials (refractive index range from 1.26 to 4.0) that can be formed as a thin film and therefore are possible materials for the dielectric layers in the proposed structures. Lists of such materials can be found in J. T. Cox and G. Hass, "Physics of Thin Films," Academic Press, New York, 1964, Vol. 2, p. 284, and in O. S. Heavens, Repts. Prog. Phys. 23, 1 (1960).

The reflecting material can be any highly reflecting metal such as Ag, Al, Rh, Cu, Au, Cr, and the like.

The magnetic layers can be Fe, Co, or Ni, a ferromagnetic alloy of these with each other or with other metals, or any other magnetic material that can be prepared in thin film form.

When an additional wear coating is necessary, this coating can be of any material or series of materials (metals, dielectrics, scratch-resistant plastics, etc.) with good wear characteristics that can be formed in a thin film and that will adhere well to the rest of the structure. If necessary, an additional layer can be placed between the metallic reflecting and wear layers to improve adhesion.

The techniques used for depositing the films in making the structures of this invention are well known and include resistance heating vapor deposition, chemical vapor deposition, electron beam deposition, and sputtering. Because of the small thickness needed for the magneto-optic layer, the depositions should be carried out in a clean system, and where appropriate, in a vacuum of at least $10^{16}$ mm. Hg.

The film thickness can be monitored either optically or by using a crystal oscillator. In the optical method, the reflectance ($p$ or $s$) is calculated theoretically as described hereinafter for each deposition and this calculated curve can then be used to control film thickness. Also, deviation from the calculated curves can be used to detect variations in the optical constants as the deposition proceeds and to observe the formation of unwanted film formed between sequential depositions. Such parameters as deposition rate can best be controlled with a crystal oscillator.

In order to determine if the desired structure has been achieved, it is desirable to measure the reflectivity and the compensated rotation of the structure. The compensated rotation is the rotation measured when the ellipticity of the reflected light is zero. These quantities can be obtained using a polarizer, analyzer, and compensator along with light source, filter, and detector. From these two quantities, the magneto-optic Fresnel coefficient can then be calculated from the relation $$k=\sqrt{R}\theta$$

where, for either $p$ or $s$ incident light, $R$ is the reflectivity and $\theta$ and $k$ are the corresponding rotation and magneto-optic Fresnel reflection coefficient, respectively.

In order to obtain improved conversivity, the original thickness and refractive index of the conversion matching layer is calculated.

The structures described above can be analyzed theoretically using the method of Hunt, J. Appl. Phys. 38, 1652 (1967). Using this method, the Fresnel reflection coefficients for a particular structure can be determined. These coefficients are defined by the equations $$\begin{pmatrix} E_p^r \\ E_s^r \end{pmatrix} = \begin{bmatrix} r_{pp} r_{ps} \\ r_{sp} r_{ss} \end{bmatrix} \begin{pmatrix} E_p^i \\ E_s^i \end{pmatrix} \quad (1)$$

where $E_p^r$ and $E_p^i$ are, respectively, the reflected and incident electric field amplitudes polarized in the plane of incidence; and $E_s^r$ and $E_s^i$ are these components polarized perpendicular to the plane of incidence. The coefficients $r_{pp}$ and $r_{ss}$ are the usual Fresnel reflection coefficients for $p$ and $s$ light, respectively, and the magneto-optic reflection coefficients for $p$ and $s$ incident light are $r_{sp}$ and $r_{ps}$, respectively. For the longitudinal Kerr effect where the magnetization lies in both the plane of the film surface and the plane of incidence, the coefficients, $r_{ss}$ and $r_{pp}$, are to first order in magnetization, independent of the magnetization, while $r_{sp}$ and $r_{ps}$ depend on the magnetization through the magneto-optic scattering parameter $Q$. This parameter is defined in the complex permittivity tensor by $$\epsilon=\epsilon_0 \begin{pmatrix} 1 & -iQ & 0 \\ iQ & 0 & 0 \\ 0 & 1 & 1 \end{pmatrix} \quad (2)$$

where $\epsilon_0$ is the dielectric constant of the material for zero magnetization. In addition, all the Fresnel coefficients depend on the refractive indices of the incident material and metallic reflecting layer, angle of incidence, the refractive index and thickness of all interlying layers, and the wavelength of the incident light.

To optimize the overall magneto-optic properties of a particular structure is is necessary to (1) maximize the magneto-optic conversivity ($[r_{sp}]^2$ and/or $[r_{ps}]^2$), and (2) minimize the phase difference between the magneto-optic and the corresponding normal Fresnel reflection coefficients, i.e., to minimize the ellipticity of the reflected light. Condition (2) above can be relaxed if a compensator (e.g., Babinet-Soleil compensator, ¼ wave plate, etc.) is used in connection with the magneto-optic surface. But, from a practical viewpoint, it is advantageous to incorporate the self-compensation in the magneto-optic structure rather than use an additional component in an optical system.

The self-compensation property is built into the structure of FIG. 1 or 2 for the example given below. This same feature can, however, be incorporated into the structure by using the configuration given in FIG. 3 where the second dielectric layer 8 is used primarily to compensate the reflected light.

The values of the optical parameters mentioned above which are necessary to achieve the two optimum conditions cannot theoretically be cast in a simple mathematical form. For this reason, it is necessary to use a computer to determine the refractive indices and thicknesses of the films which optimize a particular structure. However, there are certain general results for any structure that can be applied to minimize the number of parameters to be varied. These are:

1. For metallic magnetic materials (e.g., Fe, Co, Ni, and their alloys), the maximum conversivity occurs for minimum film thickness assuming optical constants of this film do not vary appreciably from their thick film values.

2. Generally, $r_{ps}$ is greater than $r_{sp}$ so optimization should be accomplished for $s$ incident light.

3. Conversivity increases nearly linearly with the square of the refractive index of the incident material for constant angle of incidence.

4. The angle of incidence that gives maximum conversivity is near that required for internal reflection to occur at the layer 2-layer 3 (see FIG. 1) interface.

5. The conversivity increases with the reflectivity of the final metallic layer.

With the general guides mentioned above, an optimum structure can be determined for a configuration such as that of FIG. 2 by the following procedure:

Choose materials according to the criteria discussed above for the incident medium, 1, magnetic film, 2, and final reflecting layer, 4. Pick an angle of incidence and wavelength to be used and a thickness of the magneto-optic film, 2. These values can then be utilized in the equations of Hunt to calculate the optimum conversivity and ellipticity for the structure of FIG. 2 by varying both the refractive index and thickness of the conversion matching layer.

Although no general relation exists between the refractive index and thickness of the optimum conversion matching layer and the other optical parameters of the structure, empirical ones can be determined. The procedure to be used in the determination of these is explained below for a specific embodiment having the configuration shown in FIG. 2.

The angle of incidence is selected to be 50°, the wavelength of the electromagnetic radiation is selected to be 5,800 A., layer 2 is 100 A. thick Fe film whose refractive index $N$ is $N=2.5+b\ 3.5$ and magneto-optic scattering parameter $Q$ is $Q=(2.4-0.2)\times 10^{12}$ and layer 4 is silver ($N=0.07+i3.4$). The incident medium is an optical glass prism of refractive index 1.88. The Fresnel reflection coefficient $r_{ps}$ is maximized for several values of refractive index of the conversion matching layer 3 by varying the thickness of this layer for each value of index. This coefficient along with $r_{sp}$ is shown in FIG. 4 plotted against refractive index of the conversion matching layer. The values of $\delta_{ps}$ and $\delta_{sp}$ are shown in FIG. 5 plotted against refraction index of the conversion matching layer. The designations $\delta_{sp}$ and $\delta_{ps}$ are the phase differences between the magneto-optic and corresponding normal Fresnel coefficient for $p$ and $s$ incident light, respectively. The corresponding values of the conversion matching layer thickness are plotted in FIG. 6. Similar curves are then obtained for other values of the refractive index of the incident medium. Finally, from this set of curves, simple relations can be obtained for the refractive index and thickness of the conversion matching layer required for optimum conversion and ellipticity as a function of refractive index of the incident medium. For the above example, these relations are:

$$r_{ps}=(8N_1-4.2)' \ 10^{13}$$
$$N_3=N_1-0.25$$
$$D_3=1,520+550/(N_1-1.3)$$

where $N_1$ is the refractive index of the incident medium and $N_3$ and $D_3$ are the refractive index and thickness in Angstroms, respectively, for the optimum conversion matching layer. Because of the singularity at $N_1=1.3$, the above relations are valid only for $N_1>1.3$.

The optimum refractive index of 1.63 for the conversion matching layer for a prism of refractive index 1.88 is near that for $Al_2O_3$, i.e., 1.61, a material that can easily be deposited using electron beam evaporation or sputtering techniques known in the art.

The above structure gives conversivity enhancements greater than those of previously described structures. The range of angles of incidence over which the conversivity is greater than 50 percent of its maximum value is $44° < \theta$ incidence $< 65°$. The conversivity remains above 50 percent of its maximum from about 4,200 A. to around 7,800 A., assuming the optical properties are constant over this range.

The method described above of optimizing the magneto-optic properties of the structure of FIG. 2 can, of course, be applied to other sets of optical parameters relating to different thicknesses, materials, angles of incidence, etc.

In setting up the computer program, a matrix is set up for each layer, the optical properties of any desired configuration can then be determined by multiplication of the appropriate matrices. The program can thus be readily modified to determine the reflectivity of the structure as a function of the successive layers and their thickness. Such curves can then be employed to monitor the fabrication of the structure.

The magneto-optic structure of the present invention can be used to read out signals recorded on magnetic recording members, in the manner described by Griffiths in U.S. Pat. No. 3,196,206.

The embodiments of the invention in which an exclusive property or privilege I claim are defined as follows:

1. A Kerr magneto-optic device adapted to rotate the plane of polarization of electromagnetic radiation on reflection from a magnetic mirror in response to the magnetization of said mirror which comprises, in sequence and in contact:

i. an isotropic incident medium transparent to selected electromagnetic radiation and having a refractive index of $n$ at the boundary to layer (ii);

ii. an absorbing magnetic layer the thickness of the magnetic layer being such that $$dk \lesssim 0.12\lambda$$

where $d$ is the thickness of the magnetic layer having the imaginary part of its refractive index $k$ at the wavelength, $\lambda$, of the selected radiation;

iii. a dielectric layer, the refractive index of the dielectric layer being between $n$ and about $n \sin \theta$, where $\theta$ is the selected angle of incidence for the selected radiation at the boundary between the incident medium and the first magnetic layer and having a thickness selected to enchance the conversivity of the device; and iv. a metallic reflecting layer.

2. Apparatus of claim 1 wherein the incident medium is glass.

3. Apparatus of claim 1 wherein the incident medium is in the form of a prism having a base angle about equal to the selected angle of incidence.

4. Apparatus of claim 3 in which the magnetic layer is iron having a thickness less than 200 A.

PO-1050
(5/69)

UNITED STATES PATENT OFFICE
CERTIFICATE OF CORRECTION

Patent No. 3,594,064 Dated July 20, 1971

Inventor(s) John David Bierlein

It is certified that error appears in the above-identified patent and that said Letters Patent are hereby corrected as shown below:

Col. 5, line 26

"$r_{ps} = (8N_1-4.2)' \ 10^{13}$" should read:

-- $r_{ps} = (8N_1-4.2) \times 10^{-3}$ --.

Signed and sealed this 11th day of January 1972.

(SEAL)
Attest:

EDWARD M.FLETCHER,JR.
Attesting Officer

ROBERT GOTTSCHALK
Acting Commissioner of Patents